United States Patent
Ozawa

(10) Patent No.: US 12,430,281 B2
(45) Date of Patent: Sep. 30, 2025

(54) ELECTRONIC APPARATUS, CONTROL METHOD AND STORAGE MEDIUM FOR LOOKING UP AND STORING VIRTUAL KEY INFORMATION

(71) Applicant: CASIO COMPUTER CO., LTD., Tokyo (JP)

(72) Inventor: Makoto Ozawa, Tachikawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 470 days.

(21) Appl. No.: 17/940,424

(22) Filed: Sep. 8, 2022

(65) Prior Publication Data
US 2023/0086424 A1    Mar. 23, 2023

(30) Foreign Application Priority Data
Sep. 22, 2021   (JP) ................. 2021-154445

(51) Int. Cl.
*G06F 15/02* (2006.01)
*G06F 3/0482* (2013.01)
(Continued)

(52) U.S. Cl.
CPC ........ *G06F 15/0225* (2013.01); *G06F 3/0482* (2013.01); *G06F 9/455* (2013.01);
(Continued)

(58) Field of Classification Search
CPC ...... G06F 3/048; G06F 3/0482; G06F 3/0489; G06F 3/04897; G06F 9/455;
(Continued)

(56) References Cited

U.S. PATENT DOCUMENTS 7,996,570 B1 *   8/2011   Ilyasov ................. G06F 13/105
                                                           719/321
8,196,057 B2     6/2012   Yoshizawa
(Continued)

FOREIGN PATENT DOCUMENTS

JP    2008305222 A    12/2008
JP    2010079661 A    4/2010
(Continued)

OTHER PUBLICATIONS

Extended European Search Report dated Feb. 13, 2023 received in European Patent Application No. EP 22194582.7.

*Primary Examiner* — Ting Z Lee
(74) *Attorney, Agent, or Firm* — Scully, Scott, Murphy & Presser, P.C.

(57) ABSTRACT

An electronic apparatus according to an embodiment of the disclosure includes: an input device; a storage; and at least one processor, wherein the processor identifies identification information on a key subjected to a key operation with the input device, determines, when the identification information is identified, whether the key operation satisfies a predetermined condition, and performs control in such a manner that, when the key operation is determined to satisfy the predetermined condition, virtual key information indicating a function that is designated by the key operation is stored in the storage rather than storing the identified identification information in the storage.

8 Claims, 13 Drawing Sheets

|     | Key | Key code | Application | Virtual key information |
|-----|-----|----------|-------------|-------------------------|
| (A) | [AC] | 0x01 0x01 | - | - |
|     | [1] | 0x02 0x01 | [STAT] | 0x0f 0x02 |
|     | ... | ... | ... | ... |
|     | [S⇔D][H] | 0x03 0x17 | [RUN] | 0x0f 0x12 |
|     | [(][)] | 0x03 0x18 | [Geometry] | 0x0f 0x13 |
|     | [)][J] | 0x03 0x19 | [Picture Plot] | 0x0f 0x14 |
|     | [.][K] | 0x03 0x1a | - | - |
|     | ... | ... | - | - |

KC | VC

(51) Int. Cl.
    *G06F 3/0489*     (2022.01)
    *G06F 9/455*      (2018.01)
    *G06F 16/84*      (2019.01)
    *G06F 16/901*     (2019.01)
    *G06F 3/048*      (2013.01)

(52) U.S. Cl.
    CPC .......... *G06F 16/86* (2019.01); *G06F 16/9017* (2019.01); *G06F 3/048* (2013.01); *G06F 3/04897* (2013.01); *G06F 15/0283* (2013.01)

(58) Field of Classification Search
    CPC .. G06F 15/0225; G06F 15/0283; G06F 16/86; G06F 16/9017
    See application file for complete search history.

(56) References Cited

U.S. PATENT DOCUMENTS

| | | | |
|---|---|---|---|
| 2010/0083161 A1* | 4/2010 | Yoshizawa | G06F 8/34 715/773 |
| 2016/0085716 A1* | 3/2016 | Yoshizawa | G06F 15/0225 708/146 |
| 2017/0277501 A1* | 9/2017 | Ozawa | G06F 3/1454 |

FOREIGN PATENT DOCUMENTS

| | | | |
|---|---|---|---|
| JP | 2010108163 A | 5/2010 | |
| JP | 2011175443 A | 9/2011 | |

\* cited by examiner

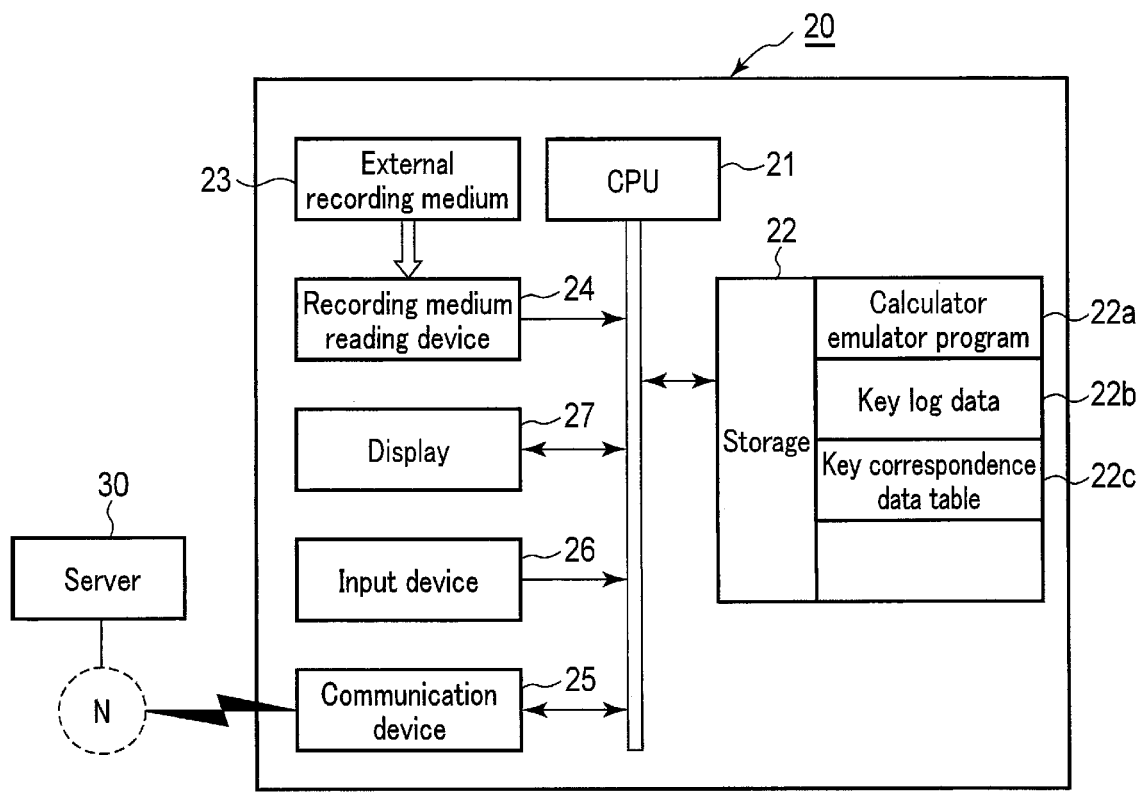
F I G. 1
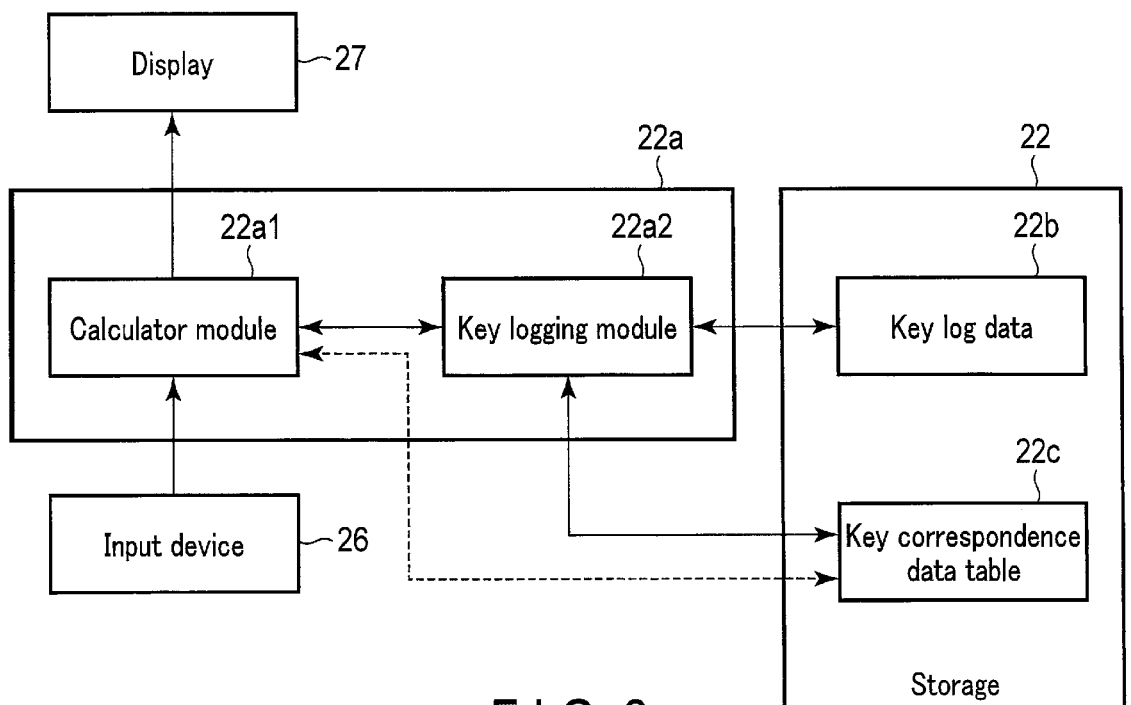
F I G. 2

(A)

| Key | Key code | Application | Virtual key information |
|---|---|---|---|
| [AC] | 0x01 0x01 | - | - |
| [1] | 0x02 0x01 | [STAT] | 0x0f 0x02 |
| ... | ... | ... | ... |
| [S⇔D][H] | 0x03 0x17 | [RUN] | 0x0f 0x12 |
| [(][I] | 0x03 0x18 | [Geometry] | 0x0f 0x13 |
| [)][J] | 0x03 0x19 | [Picture Plot] | 0x0f 0x14 |
| [,][K] | 0x03 0x1a | - | - |
| ... | ... | - | - |

| Key | Key code | Application | Virtual key information |
|---|---|---|---|
| [AC] | 0x01 0x01 | - | - |
| [1] | 0x02 0x01 | [STAT] | 0x0f 0x02 |
| ... | ... | ... | ... |
| [S⇔D][H] | 0x03 0x17 | [Distribution] | 0x0f 0x15 |
| [(][I] | 0x03 0x18 | [RUN] | 0x0f 0x12 |
| [)][J] | 0x03 0x19 | [Geometry] | 0x0f 0x13 |
| [,][K] | 0x03 0x1a | [Picture Plot] | 0x0f 0x14 |
| ... | ... | - | - |

FIG. 5B

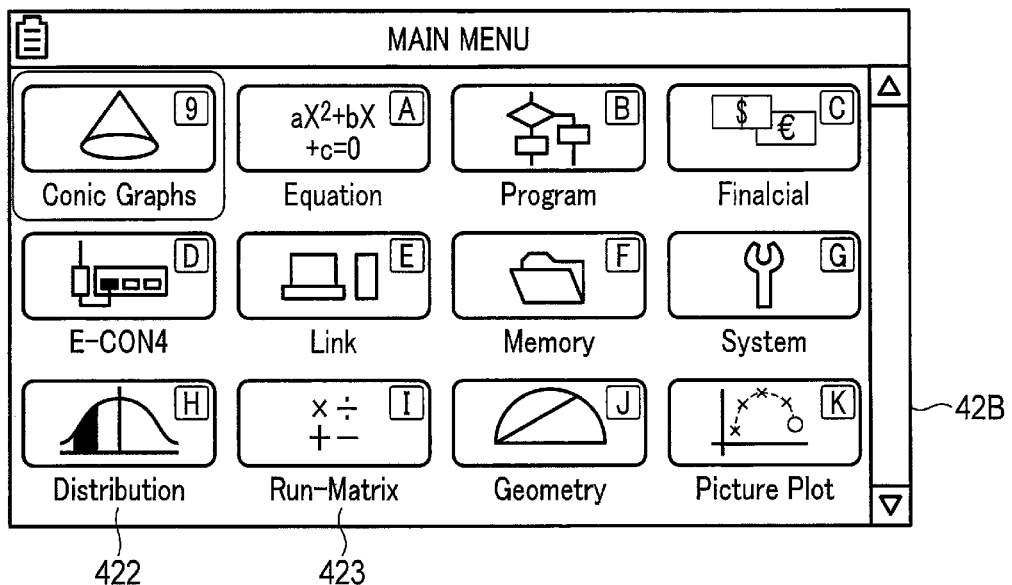
F I G. 10
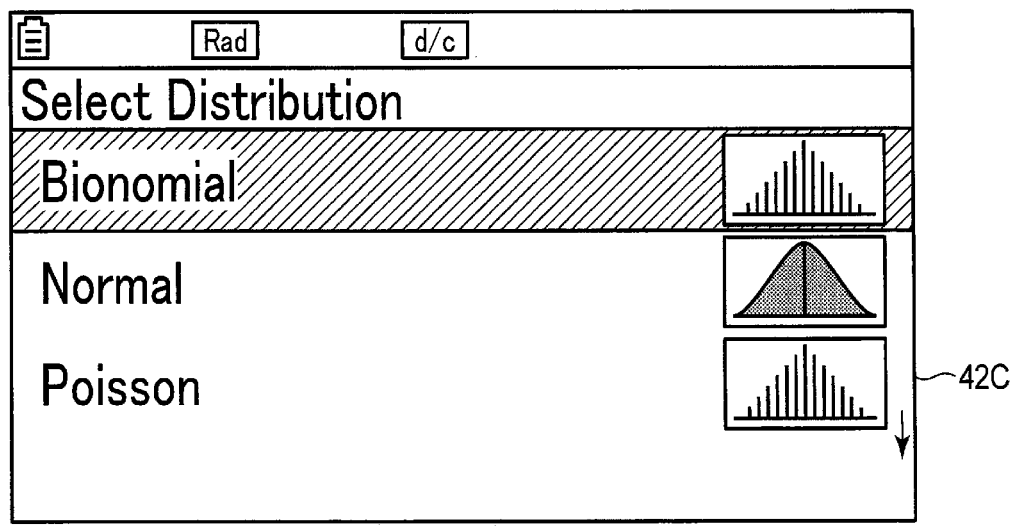
F I G. 11

ELECTRONIC APPARATUS, CONTROL METHOD AND STORAGE MEDIUM FOR LOOKING UP AND STORING VIRTUAL KEY INFORMATION

CROSS-REFERENCE TO RELATED APPLICATION

This application is based upon and claims the benefit of priority from prior Japanese Patent Application No. 2021-154445, filed Sep. 22, 2021, the entire contents of which are incorporated herein by reference.

TECHNICAL FIELD

The present disclosure relates to an electronic apparatus control method and storage medium.

DESCRIPTION OF RELATED ART

Recently, small electronic computers called scientific electronic calculators, which is capable of performing a variety of calculation processing including functional calculation, have been in widespread, practical use. Further, as described in Jpn. Pat. Appln. KOKAI Publication No. 2010-079661, computation on a level with that of a scientific electronic calculator can be executed in an electronic apparatus (e.g., a personal computer) by causing the electronic apparatus to execute a scientific-electronic-calculator emulator program.

Further, some scientific-electronic-calculator emulator programs include a key logging function. The key logging function is a function capable of recording key input operations executed for executing a computation as key log data and capable of playing back the computation based on the recorded key log data.

A scientific electronic calculator is equipped with not only functions of typical numeric calculations but also functions (applications) for executing particular computational processing. Examples of the particular computation processing include graph drawing, trigonometric function computation, statistic calculation, and matrix calculation. For example, a scientific electronic calculator displays a plurality of functions in a menu in list form, and in a case where a position to which a function in the menu is assigned is indicated by a key operation, the scientific electronic calculator executes the function at the indicated position.

By the key logging function, in a case where a key operation for indicating a function is performed from a menu, a piece of identification information (key code) indicating a key subjected to the key operation is stored as a record of a key log.

BRIEF SUMMARY

An electronic apparatus according to an embodiment of the disclosure includes: an input device; a storage; and at least one processor, wherein the processor identifies identification information on a key subjected to a key operation with the input device, determines, when the identification information is identified, whether the key operation satisfies a predetermined condition, and performs control in such a manner that, when the key operation is determined to satisfy the predetermined condition, virtual key information indicating a function that is designated by the key operation is stored in the storage rather than storing the identified identification information in the storage.

BRIEF DESCRIPTION OF THE DRAWINGS

The components in the drawings are not necessarily to scale relative to each other.

FIG. 1 is a block diagram illustrating a configuration of an electronic circuit of an electronic apparatus in the present embodiment.

FIG. 2 is a diagram illustrating an example of a processing module that is implemented by a CPU in the present embodiment executing a calculator emulator program.

FIG. 5A is a diagram illustrating an example of a key correspondence data table in the present embodiment.

FIG. 5B is a diagram illustrating an example of a key correspondence data table including virtual key information in the present embodiment.

FIG. 10 is a picture illustrating an example of a menu that is displayed on a display in the first embodiment after a function is added.

FIG. 11 is a picture illustrating an example of a screen for the function "Distribution" in the first embodiment.

DETAILED DESCRIPTION

Figure 3:
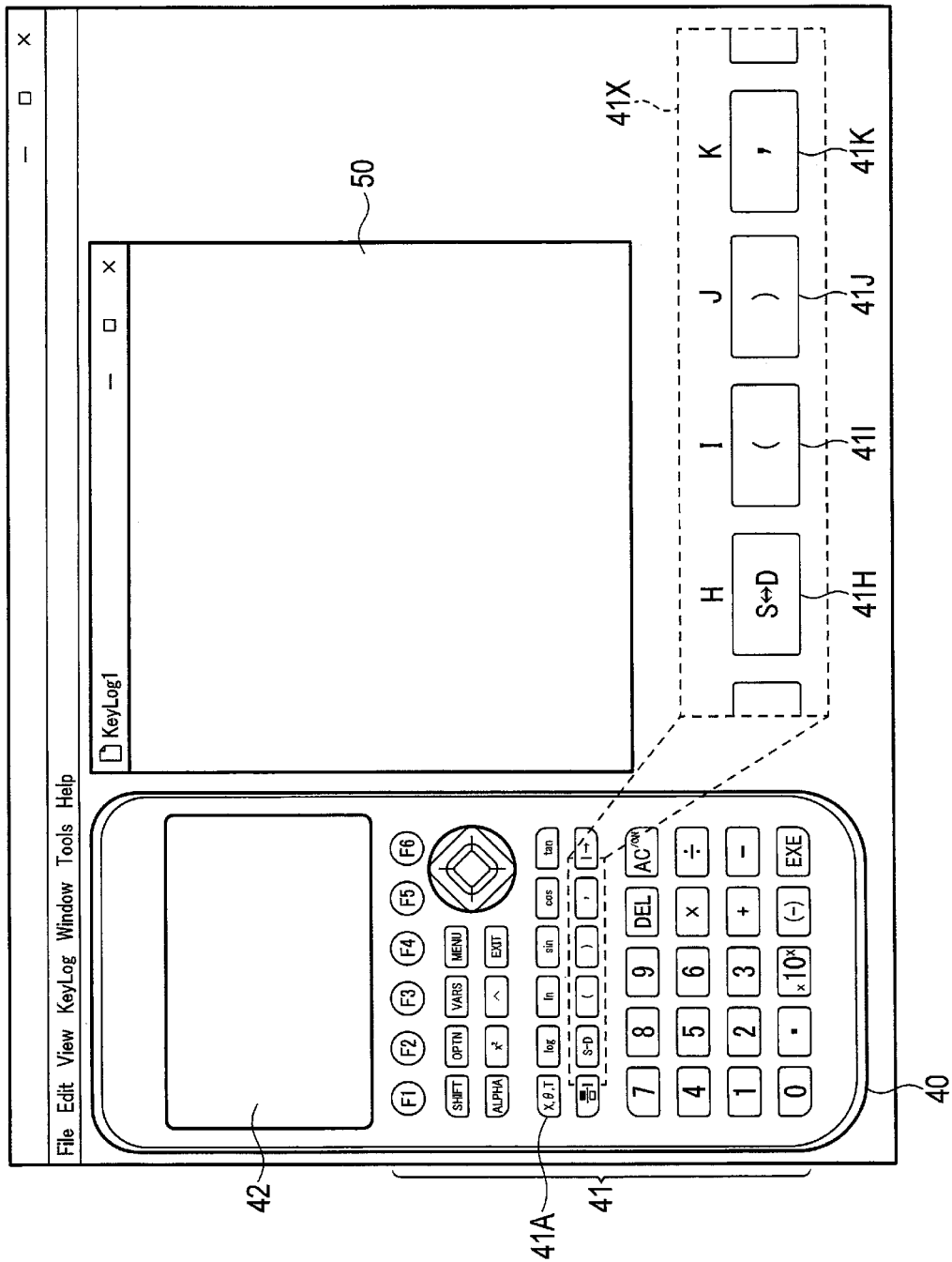
FIG. 3 is a picture illustrating an example of a calculator emulator screen in the present embodiment.

Embodiments of the present disclosure will be described below with reference to the drawings.

FIG. 1 is a block diagram illustrating a configuration of an electronic circuit of an electronic apparatus 20 in the present embodiment.

In the present embodiment, the electronic apparatus 20 is assumed to be, for example, a personal computer. Note that the electronic apparatus 20 can be provided in various forms of electronic apparatuses such as a smartphone, a tablet PC, a game console, and a server. In a case where the electronic apparatus 20 is provided in the form of a server, an input operation is performed on another electronic apparatus (personal computer, etc.) connected over a network, and details of processing performed by the server based on the input operation are displayed on a display.

The electronic apparatus 20 reads a program recorded in a recording medium of various types or a transmitted program, thus having a configuration of a computer of which actions are to be controlled by the read program. The electronic circuit of the electronic apparatus 20 is provided with a central processing unit (CPU) 21.

The CPU 21 functions as a control device that controls the entire electronic apparatus 20. The CPU 21 controls actions of each component of the circuit based on a control program stored in a storage 22 in advance, a control program read into the storage 22 from an external recording medium 23 via a recording medium reading device 24, or a control program read into the storage 22 from an external apparatus (server 30, etc.) over a network N such as the Internet.

The control program stored in the storage 22 is run in response to an input signal (key input) based on a user operation from an input device 26 or a communication signal indicating that a connection is established with the external recording medium 23 such as an EEPROM (R), a RAM, and a ROM via the recording medium reading device 24.

The CPU 21 is connected to the storage 22, the recording medium reading device 24, a communication device 25, the input device 26 (keyboard, mouse, etc.), a display 27 (liquid crystal display (LCD), etc.). Note that a touch panel may be provided in place of the display 27 and used as the display and the input device.

The control program stored in the storage 22 includes a calculator emulator program 22a and the like. The calculator emulator program 22a is a program that executes computations equivalent to those of a scientific electronic calculator (device) in the electronic apparatus 20. The calculator emulator program 22a implements a calculator module 22a1 that performs (emulates) computations equivalent to those of a scientific electronic calculator in response to an input operation and a key logging module 22a2 that performs processing pertaining to key logging (see FIG. 2).

Further, in the storage 22, key log data 22b, a key correspondence data table 22c, and the like are stored as the calculator emulator program 22a is executed.

The key log data 22b is stored by key logging processing by the calculator emulator program 22a (calculator module 22a1). The key log data 22b is data indicating pieces of identification information (key codes) of keys used in key operations. In a key log, items of key code data corresponding to a series of key operations for executing a computation are recorded on a time-series basis. The key log data 22b in the present embodiment includes, as the items of key code data, key codes as well as pieces of virtual key information that are recorded as a substitution for key codes (described later).

The key correspondence data table 22c includes items of data associated with key codes (pieces of identification information) each to be input by a key operation and specific pieces of virtual key information that correspond to key codes and are assigned to functions (applications) that are displayed in a menu in list form (see FIG. 5A and FIG. 5B). The pieces of virtual key information are, for example, items of code data in the same format as that of the key codes to be input by key operations. That is, the calculator emulator program 22a (the calculator module 22a1 and the key logging module 22a2) can process the pieces of virtual key information in the same manner as existing key codes. Note that the pieces of virtual key information are not limited to the key codes, and specific items of data of other types associated with functions (applications) such as items of text data representing the names of the functions (applications) can be used.

When a key operation for recording a key log satisfies a predetermined condition, the CPU 21 acquires virtual key information corresponding to this key code from the key correspondence data table 22c instead of the key code input by this key operation. Then, the obtained virtual key information is recorded in the key log data 22b.

A case where a key operation satisfies the predetermined condition is assumed to be a case where, for example, the key operation is a key operation of designating a given function from a menu including a plurality of functions.

The key correspondence data table 22c is also used to acquire key codes corresponding to virtual key information recorded in the key log when key log playback processing is executed based on the key log.

Although a case where a key operation satisfies the predetermined condition is supposed to be a case where the key operation is a key operation of designating a given function from a menu including a plurality of functions. However, a key operation of another type may be used for the condition. For example, in a case where a plurality of keys provided in a key section 41 includes a key or keys of which assignments to functions can be changed by an update or the like (e.g., function keys F1 to F6), a case where a key operation is performed on such a key may be considered to satisfy the condition.

The communication device 25 performs communication control on communication with another electronic apparatus (e.g., the server 30) via the network N such as the Internet and a local area network (LAN) or performs communication control on near field communication, such as Bluetooth (R) and Wi-Fi (R), with another electronic apparatus at a short distance.

The electronic apparatus 20 configured in such a manner implements functions to be described in the following description of actions, by the CPU 21 controlling actions of each component of the circuit according to instructions written in various programs such as the calculator emulator program 22a, thus causing software and hardware to operate in cooperation with each other.

FIG. 2 is a diagram illustrating an example of a processing module that is implemented by the CPU 21 in the present embodiment executing the calculator emulator program 22a. The CPU 21 implements, for example, the calculator module 22a1 and the key logging module 22a2.

The calculator module 22a1 is a module that virtually executes functions of a scientific electronic calculator based on key operations on the input device 26. The calculator module 22a1 causes the display 27 to display a calculator emulator screen and to display a result of processing based on a key operation on the input device 26.

FIG. 3 is a picture illustrating an example of the calculator emulator screen in the present embodiment.

As illustrated in FIG. 3, the calculator emulator screen is provided with an emulator image 40 that represents an appearance of a face of the scientific electronic calculator. Further, in a case where key log playback processing for playing back a computation is executed based on a key log, the calculator emulator screen is provided with a file area 50 that displays details of the key logging (key codes).

The emulator image 40 is provided with the key section 41 in which keys equivalent to those of the scientific electronic calculator are arranged and is provided with a display 42 for displaying details of a computation.

The keys provided in the key section 41 are each associated with a given key of the input device 26 (keyboard). For example, numeric keys, function keys, and keys of elementary operations of arithmetic of the key section 41 are associated with keys of the input device 26 (keyboard) having their respective names. In a case where a key provided in the key section 41 has no counterpart in the input device 26 (keyboard), a given key of the input device 26 (keyboard) is assigned. For example, the tab [Tab] key of the input device 26 is assigned to the [AC] key of the key section 41, and the enter [Enter] key of the input device 26 is assigned to the [EXE] key of the key section 41.

Further, given keys in the key section 41 are assigned to letters of the alphabet (e.g., A to Z) because, for example, the alphabet is used for indicating a given position of one of a plurality of choices (icons, etc.) in a menu displayed on the display 42.

For example, a key 41A illustrated in FIG. 3 is assigned to "A". Likewise, as illustrated in a key section 41X illustrating a part of the key section 41 illustrated in FIG. 3 in an enlarged manner, for example, a key 41H is assigned to "H," a key 41I is assigned to "I," a key 41J is assigned to "J," and a key 41K is assigned to "K". On the keys to which the alphabet is assigned, the assigned letters of the alphabet (the letters "H," "I," and "K" in FIG. 3) are displayed in the vicinities of the keys.

Note that a key operation on the key section 41 need not be performed only by an operation on the input device 26 (keyboard). The key operation may be a key operation performed by pointing (indication of a position) on the key section 41 displayed on the display 27 with a pointing device such as a mouse and a touchpad.

In a case where instructions to record a key log are given, the key logging module 22a2 receives key codes from the calculator module 22a1 and records the key codes in the storage 22 in the form of the key log data 22b. At this time, in a case where a key code received from the calculator module 22a1 represents a key operation satisfying the predetermined condition, the key logging module 22a2 looks up the key correspondence data table 22c and records a piece of virtual key information corresponding to the key code as a record of the key log data 22b in place of the key code.

In a case where instructions to play back the key log are given, the key logging module 22a2 looks up the key correspondence data table 22c to obtain key codes corresponding to the pieces of virtual key information recorded in the form of the key log data 22b and transmits the key codes to the calculator module 22a1.

Figure 4:
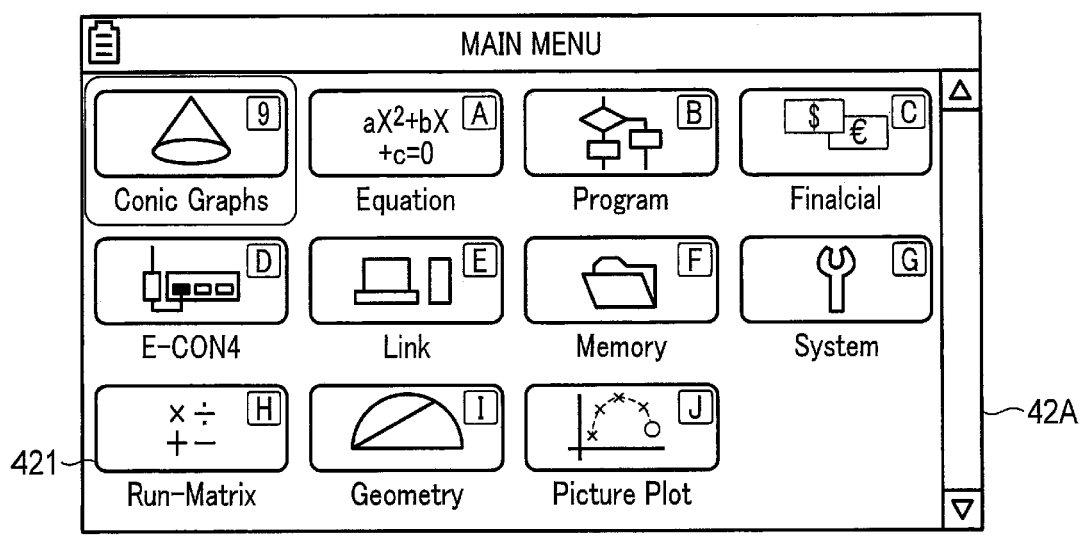
FIG. 4 is a picture illustrating an example of a menu displayed on a display in the present embodiment.

FIG. 4 is a picture illustrating an example of a menu 42A displayed on the display 42 in the present embodiment.

In the menu 42A illustrated in FIG. 4, for example, icons corresponding to four functions (applications) are displayed in each row. In the menu 42A, 1 to 9 and A to J are assigned in an order from a leftmost position (beginning position) in the first row. The example illustrated in FIG. 4 depicts a state where icons of functions (Conic Graphs) beginning from an icon of function at a position of "9" are displayed by the menu 42A being scrolled.

By performing a key operation on given one of the keys 1 to 9 and A to J each indicating a display position when the menu 42A is displayed, a function designated by the key operation can be executed. Note that the key section 41 does not include keys corresponding to the letters of the alphabet, and thus the letters of the alphabet are each assigned to a given function key in the key section 41.

FIG. 5A is a diagram illustrating an example of the key correspondence data table 22c in the present embodiment. The example includes pieces of virtual key information corresponding to key codes based on the menu 42A illustrated in FIG. 4.

As illustrated in FIG. 5A, in the key correspondence data table 22c, pieces of virtual key information VC specific to the functions (applications) in the menu 42A are set in association with key codes KC to be input based on key operations designating the respective functions (applications).

That is, for a function "RUN" 421 at a position of "H" in the menu 42A, a code "[0x0f0x12]", which indicates a piece of virtual key information specific to the function (application) "RUN" is set in association with a key code [0x030x17], which indicates the key 41H assigned to "H" (e.g., the key "S-D" corresponding to a function of decimal representation). Further, for a function "Geometry" at a position of "I" in the menu 42A, a code "0x0f0x13", which indicates a piece of virtual key information specific to the function "Geometry" is set in association with a key code [0x030x18], which indicates the key 41I of "I". Likewise, for each function (application) in the menu 42A, a piece of virtual key information specific to the function is set in association with a key code of a key to be subjected to a key operation for executing the function. Note that key codes illustrated in FIG. 5A and FIG. 5B are represented in the form of an item of 2-byte data.

Note that, in the key correspondence data table 22c illustrated in FIG. 5A, only the pieces of virtual key information VC are set in association with the key codes KC corresponding to the functions (applications) in the menu 42A. However, pieces of virtual key information VC may be similarly set for keys of which functions are changed by an update or the like (e.g., function keys).

First Embodiment

Next, actions in a first embodiment will be described.

Figure 6:
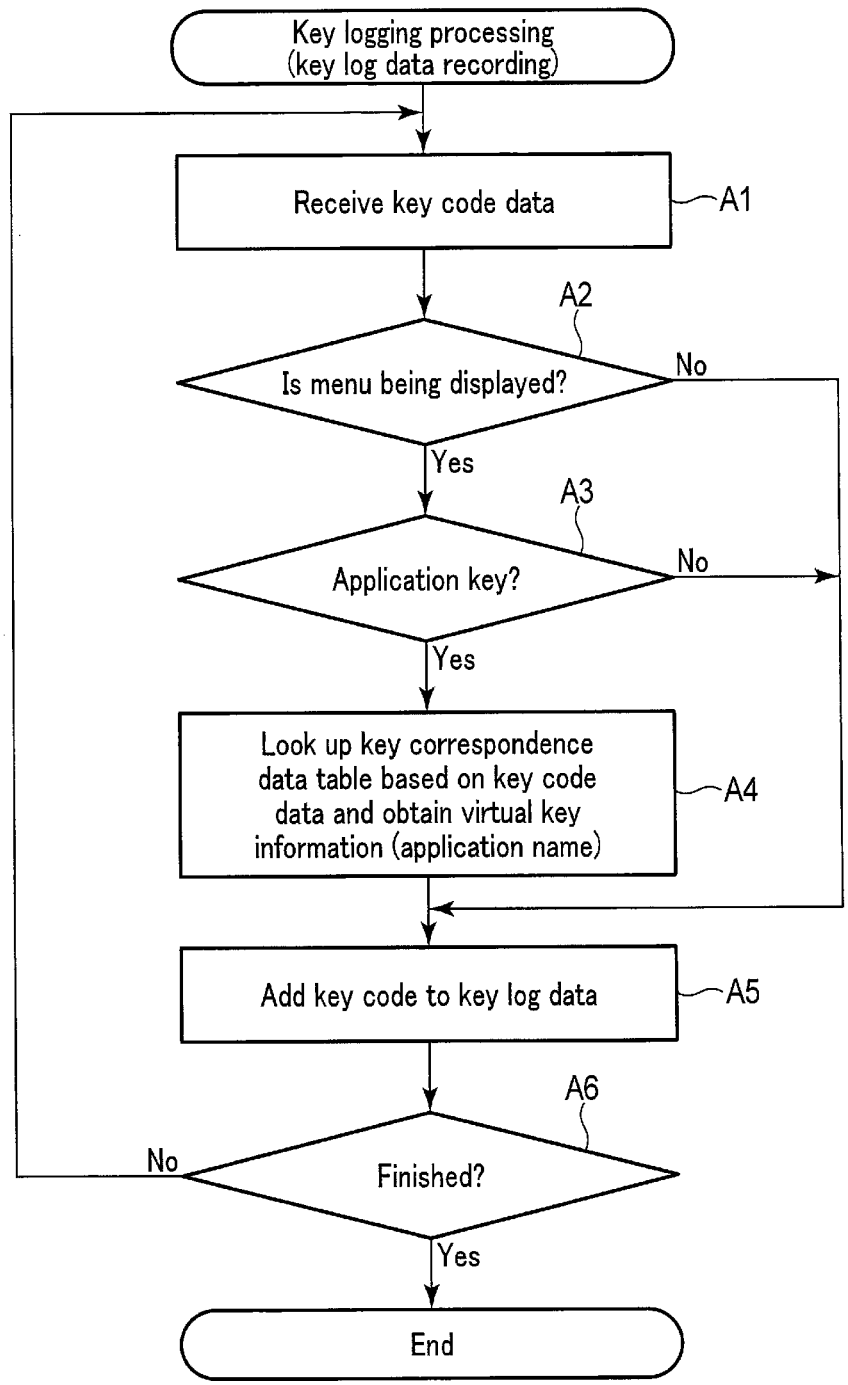
FIG. 6 is a flowchart illustrating key logging processing by a key logging module in a first embodiment.
Figure 7:
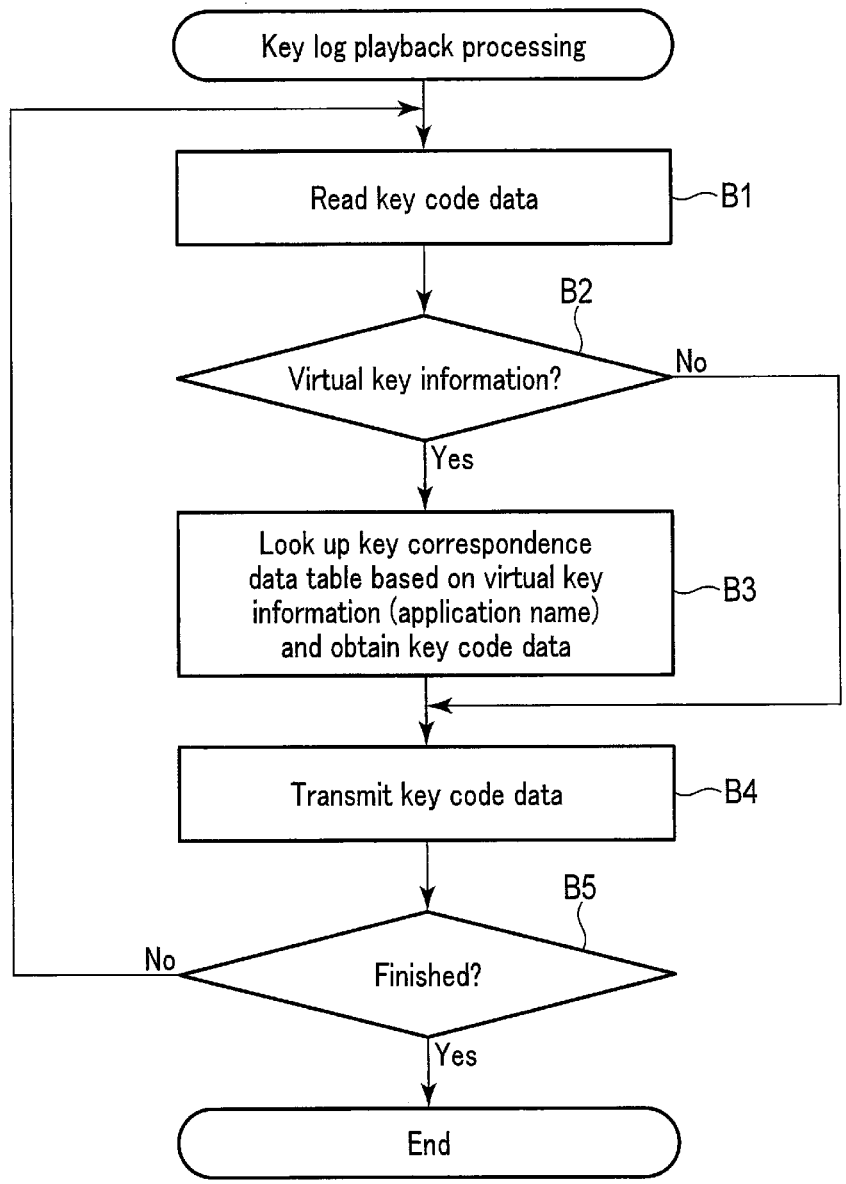
FIG. 7 is a flowchart illustrating key log playback processing by the key logging module in the first embodiment.

FIG. 6 is a flowchart illustrating the key logging processing by the key logging module 22a2 in the first embodiment. FIG. 7 is a flowchart illustrating the key log playback processing by the key logging module 22a2 in the first embodiment.

In a case where the CPU 21 is instructed to record a key log by a user operation, based on key operations for computational processing performed on the input device 26 by a user, the CPU 21 causes the calculator module 22a1 to execute the computational processing and causes the key logging module 22a2 to execute recording of the key log.

Figure 8:
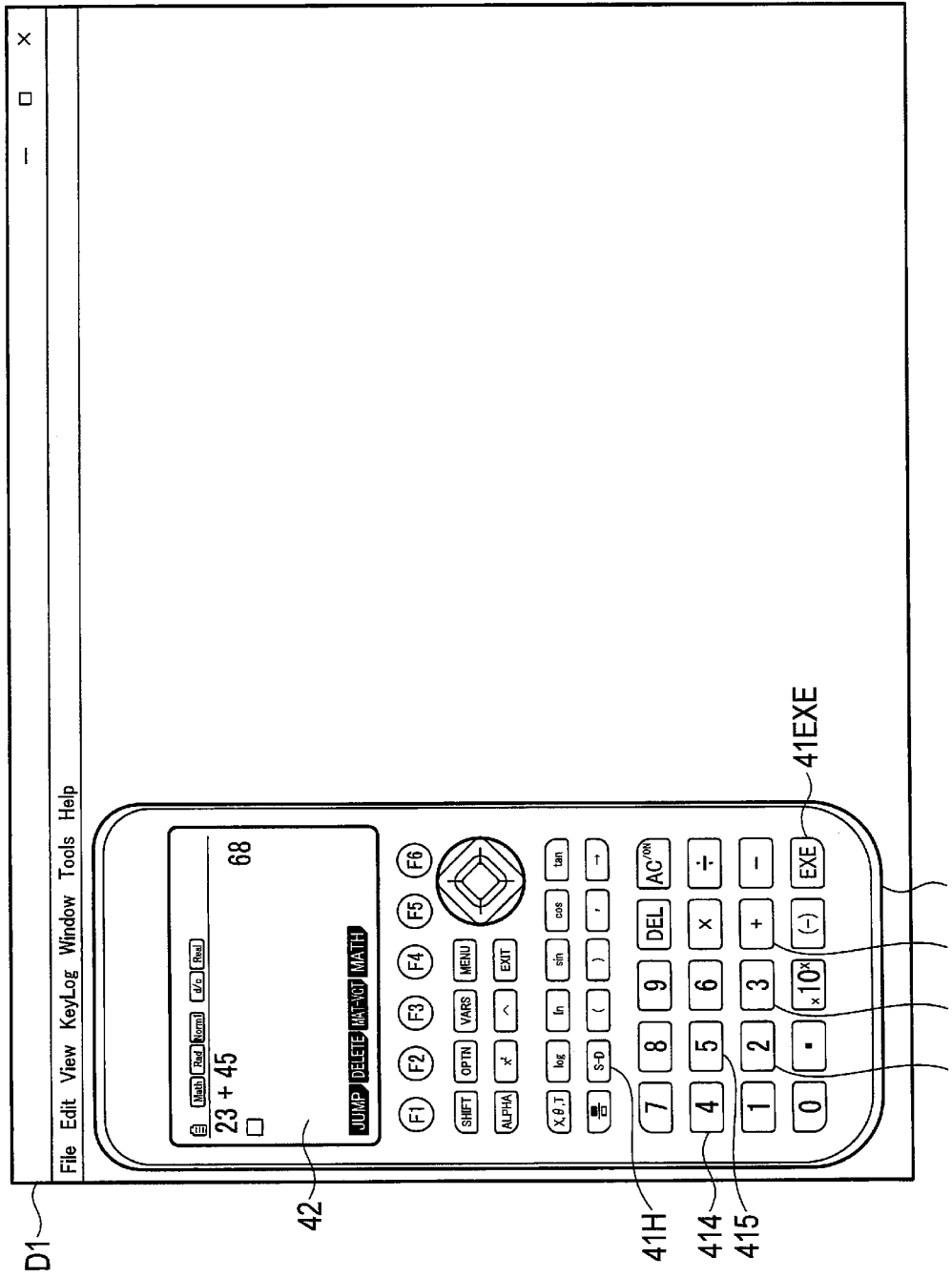
FIG. 8 is a picture illustrating an example of a calculator emulator screen in a case where computational processing in the first embodiment is executed.

FIG. 8 is a picture illustrating an example of a calculator emulator screen D1 in a case where the computational processing in the first embodiment is executed. In the calculator emulator screen D1, the emulator image 40 is displayed.

The example illustrated in FIG. 8 illustrates an example of executing the addition "23+45". In a case where the computational processing is executed, a user performs a key operation of indicating an icon of a function of elementary operations of arithmetic (Run) that is displayed at a position of "H" in the menu 42A illustrated in FIG. 4 with the menu being displayed on the display 42. Specifically, the user performs a key operation on the key 41H for a decimal representation key "S-D" assigned to a key input for the letter "H".

Thereafter, the user performs key operations on a key 412 for "2", a key 413 for "3", a key 41+ for "+", a key 414 for "4", and a key 415 for "5", and finally performs a key operation on a "EXE" key 41 for indicating the execution of the computation.

The calculator module 22a1 identifies a key code (a piece of identification information) corresponding to each of the key operations received as the key operations performed on the input device 26. Based on the key codes corresponding to the key operations, the calculator module 22a1 sequentially displays the input letters (an expression) on the display 42, executes a computation based on the key code for indicating the execution of the computation, and displays the result of the computation 68".

At the same time, the calculator module 22a1 transmits sequentially the key codes received from the input device 26 by the key operations to the key logging module 22a2 to record the key codes as records of a key log.

In a case where the key logging module 22a2 receives a key code from the calculator module 22a1 (step A1), the key logging module 22a2 determines whether the menu 42A is being displayed on the display 42. If the menu 42A is being displayed (step A2, Yes), the key logging module 22a2 determines whether the key code indicates a key operation for designating a function (application) set in the menu 42A. That is, whether the key operation satisfies the predetermined condition is determined.

Here, if the key operation is a key operation for a given function displayed on the menu 42A (in the example illustrated in FIG. 4, a key operation on any of 1 to 9 or any of A to J) (step A3, Yes), the key logging module 22a2 looks up the key correspondence data table 22c based on the key code and obtains a piece of virtual key information corresponding to the key code (step A4).

In place of the key code received from the calculator module 22a1, the key logging module 22a2 adds the piece of virtual key information obtained based on the key correspondence data table 22c to the key log data 22b as a record of a key log (step A5).

For example, in a case where a key operation on the letter "H" (key 41H) indicating the position of the icon of the function (Run) illustrated in FIG. 4 is performed to execute the function (Run), the key code [0x030x17] in the key correspondence data table 22c illustrated in FIG. 5A is received. In a case where this key code is received while the menu 42A is being displayed, the piece of virtual key information [0x0f0x12] that corresponds to the key code [0x030x17] and is specific to the function (Run) is added to the key log data 22b.

If the menu 42A is not being displayed (step A2, No) or if the key operation is not a key operation for designating a function (application) even while the menu 42A is being displayed (step A3, No), the calculator module 22a1 adds the key code received from the calculator module 22a1 to the key log data 22b as it is (step A5).

In a case where a key operation for computational processing is not finished (step A6, No), the CPU 21 (the key logging module 22a2) repeats the processing described above (steps A1 to A5). If the key operation for computational processing is finished (step A6, Yes), the CPU 21 finishes the key logging processing.

Figures 9A, 9B:
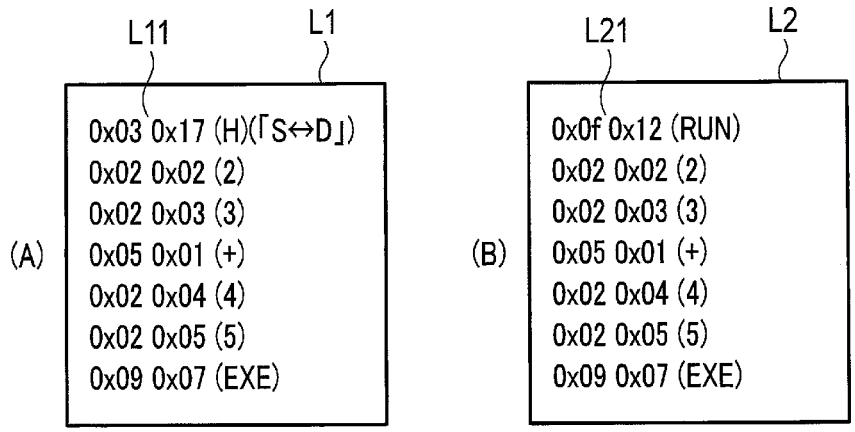
FIG. 9A is a diagram illustrating an example of content of key log data of a case where no key code is converted into a piece of virtual key information, in the first embodiment.
FIG. 9B is a diagram illustrating an example of content of key log data of a case where a key code is converted into a piece of virtual key information with reference to a key correspondence data table, in the first embodiment.

FIG. 9A illustrates content of key log data 22b in a case where key codes are not converted into pieces of virtual key information with reference to the key correspondence data table 22c, and FIG. 9B illustrates content of key log data 22b in a case where the key logging module 22a2 in the first embodiment looks up the key correspondence data table 22c and converts key codes into pieces of virtual key information.

In an example illustrated in FIG. 9A, the key code [0x030x17] indicating a key operation on the key 41H indicating the position of "H" in the menu 42A is recorded. In contrast, in an example illustrated in FIG. 9B, in place of the key code [0x030x17], the code [0x0f0x12] indicating the piece of virtual key information specific to the function "RUN" is recorded in response to a key operation on the key 41H indicating the position of "H" in the menu 42A.

Next, a case where a function is added to the menu 42A by an update or the like will be described.

FIG. 10 is a diagram illustrating an example of a menu 42B that is displayed on the display 42 in the first embodiment after the function is added.

In the menu 42B illustrated in FIG. 10, for example, a new function "Distribution" 422 is added to the position of "H", and the function 423 (Run), which is originally at the position of "H", is moved to a position of "I". Likewise, functions at the positions of "I" and "J" are moved to the positions of "J" and "K", respectively.

In this manner, in a case where an update of adding a function to the menu 42B is performed, the key correspondence data table 22c is also updated based on the addition of the function. FIG. 5B illustrates an example of the key correspondence data table 22c that includes pieces of the virtual key information VC corresponding to key codes KC based on the menu 42B illustrated in FIG. 10.

As illustrated in FIG. 5B, for the function "Distribution" added to the positions of "H" in the menu 42B, a piece of virtual key information [0x0f0x15] specific to the function "Distribution" is added in association with the key code [0x030x17] of the key 41H for "H".

By adding the function "Distribution" to the position of "H" in the menu 42B, the function "RUN" is moved to the position of "I" in the menu 42B, the function "Geometry" is moved to a position of "J", and the function "Picture Plot" is moved to the position of "K". Therefore, for the key codes KC in the key correspondence data table 22c, the key code [0x030x18] to be input by a key operation on "I" in the menu 42B is associated with the function "RUN". Likewise, the key code [0x030x19] for "J" is associated with the function "Geometry", and the key code [0x030x1a] for "K" is associated with the function "Picture Plot".

In contrast, as to the virtual key information VC, the functions are associated with the same pieces of the virtual key information VC as those before the functions are added, as in FIG. 5A, irrespective of the movement of the positions of the functions in the menu.

Figures 9C, 9D:
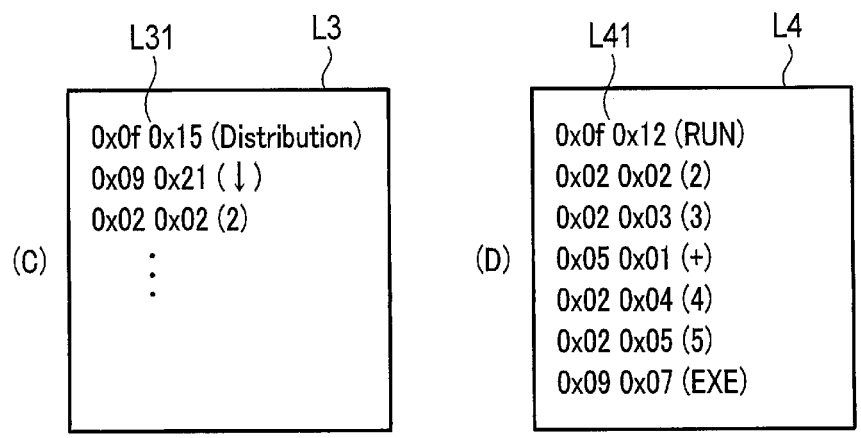
FIG. 9C is a diagram illustrating an example of content of key log data of a case where a piece of virtual key information [0xx0f0x15] specific to the function "Distribution" corresponding to the key code [0x030x17] is recorded with reference to the key correspondence data table, in the first embodiment.
FIG. 9D is a diagram illustrating an example of content of key log data of a case where a key operation for indicating an icon of a function (Run) displayed at a position of "I" is performed to execute an addition, in the first embodiment.

In the menu 42B illustrated in FIG. 10, in a case where a key operation for designating the newly added function "Distribution" is performed, the key code [0x030x17] of the key 41H for "H" is input, and a screen 42C for the function "Distribution" is displayed on the display 42 as illustrated in FIG. 11, and its computational processing is executed. Further, as described above, by the key logging processing, the piece of virtual key information [0x0f0x15] specific to the function "Distribution" corresponding to the key code [0x030x17] is recorded in key log data 22b with reference to the key correspondence data table 22c in response to a key operation for designating the function "Distribution" as illustrated in FIG. 9C.

In this manner, in the first embodiment, even in a case where an addition (or change) of a function to the menu 42A causes movement of positions of functions in the menu, a key code received by a key operation for designating a function in the menu can be recorded as a record of the key log data 22b in the form of a piece of virtual key information specific to the function. This allows a user to recognize a key log displayed as a correct key log according to a current arrangement of functions even before and after addition of a function.

Further, this enables the same computational processing as that performed while its key log is recorded to be played back irrespective of addition (or change) of a function to the menu 42A, by the key log playback processing described below.

Next, the key log playback processing by the key logging module 22a2 in the first embodiment will be described.

In a case where a key log (key log file) to be played back is selected by a user operation from the key log data 22b stored in the storage 22, by which instructions to execute the playback are given, the CPU 21 shifts to a playback state of the key log to be played back. The CPU 21 causes the file area 50 for displaying content (key codes) of the key log to be displayed on the calculator emulator screen.

In the key log playback processing, the key logging module 22a2 sequentially reads the key codes from the key log and transmits the key codes to the calculator module 22a1. Based on the key codes received from the key logging module 22a2, the calculator module 22a1 sequentially displays symbols of keys subjected to key operations in the file area 50 and executes a playback of a computation corresponding to the key log by executing the same processing as those performed when the key operations are performed and displaying details of the computation on the display 42.

Here, consider a key log playback with the key log data 22b that is recorded before a function is added to the menu 42A.

Figure 12:
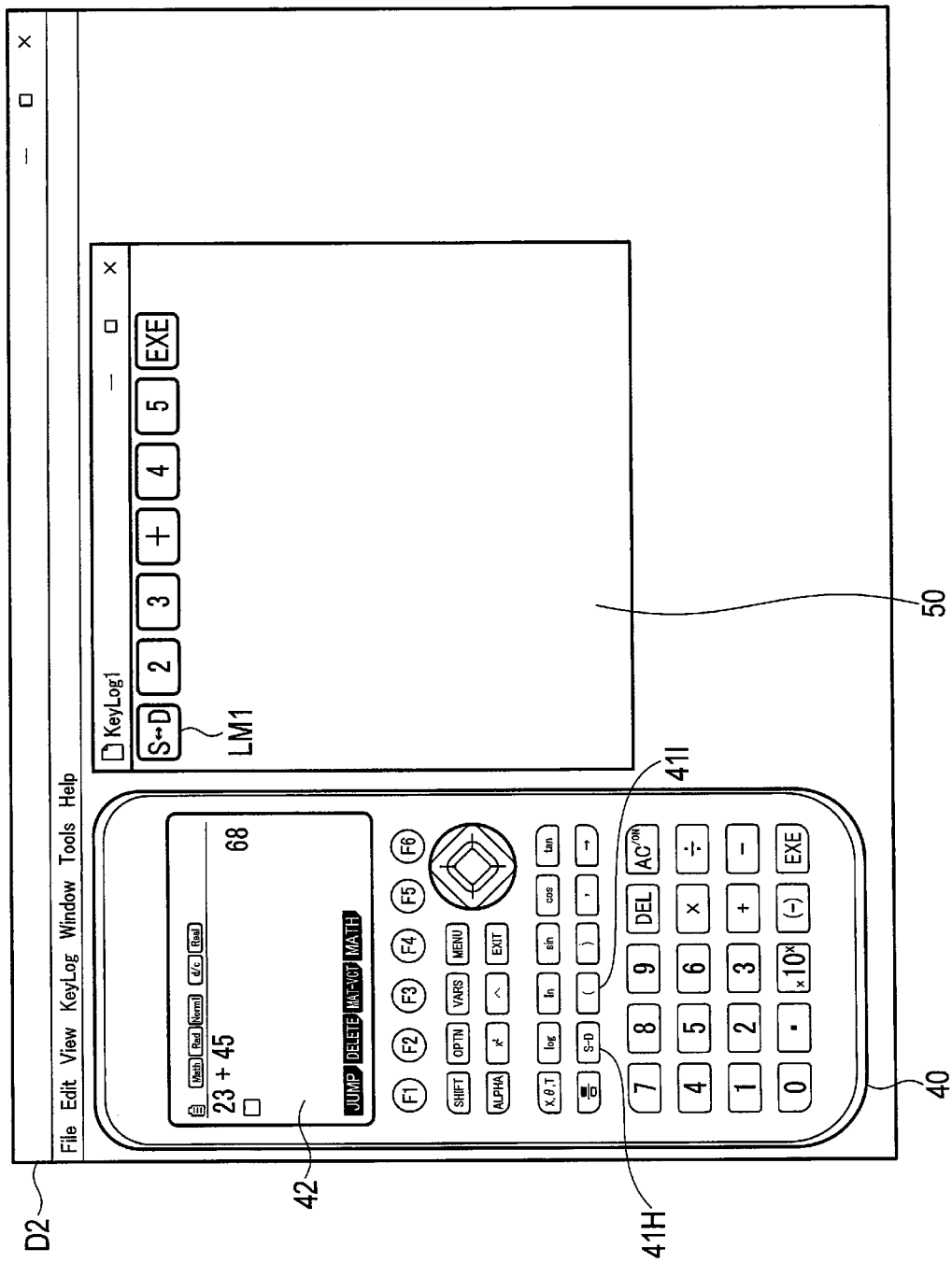
FIG. 12 is a picture illustrating an example of a calculator emulator screen based on key log data before a function is added.

FIG. 12 is a picture illustrating an example of a calculator emulator screen D2 at the time of playing back a key log based on the key log data 22b before a function is added, illustrated in FIG. 9A. In the calculator emulator screen D2, the emulator image 40 as well as the file area 50 is displayed.

As illustrated in FIG. 12, in the file area 50, content of key log data 22b (L1) is illustrated in FIG. 9A. That is, the key log data 22b illustrated in FIG. 9A shows that, after a key operation for indicating the icon of the function (Run) is performed, key operations for inputting "2", "3", "+", "4", and "5" are performed, and a key operation is finally performed on the "EXE" key 41 for indicating execution of a computation.

Therefore, in the file area 50, a symbol LM1 for "S-D" (indicating the key 41H) corresponding to a key operation for indicating the function (Run) and then symbols corresponding to keys "2", "3", "+", "4", "5", and "EXE" are sequentially displayed as the computation based on the key codes is played back.

Next, a case where a key log playback is executed after a function is added, based on the key log data 22b illustrated in FIG. 9A that is recorded before a function is added to the menu 42A, is described.

As illustrated in FIG. 9A, in the key log data 22b (L1), as a key code corresponding to a function (application), a key code L11 [0x030x17] indicating a key operation indicating the function "RUN" that is set at the position of "H" in the menu 42A before a function is added is recorded.

After the function "Distribution" is added, the function "Distribution" is assigned to the position of "H" in menu 42B as illustrated in FIG. 10. Therefore, in a case where computational processing is executed based on a key code indicating a key operation for indicating the position of "H", a function to be executed is not the function "RUN" but the function "Distribution".

Figure 13:
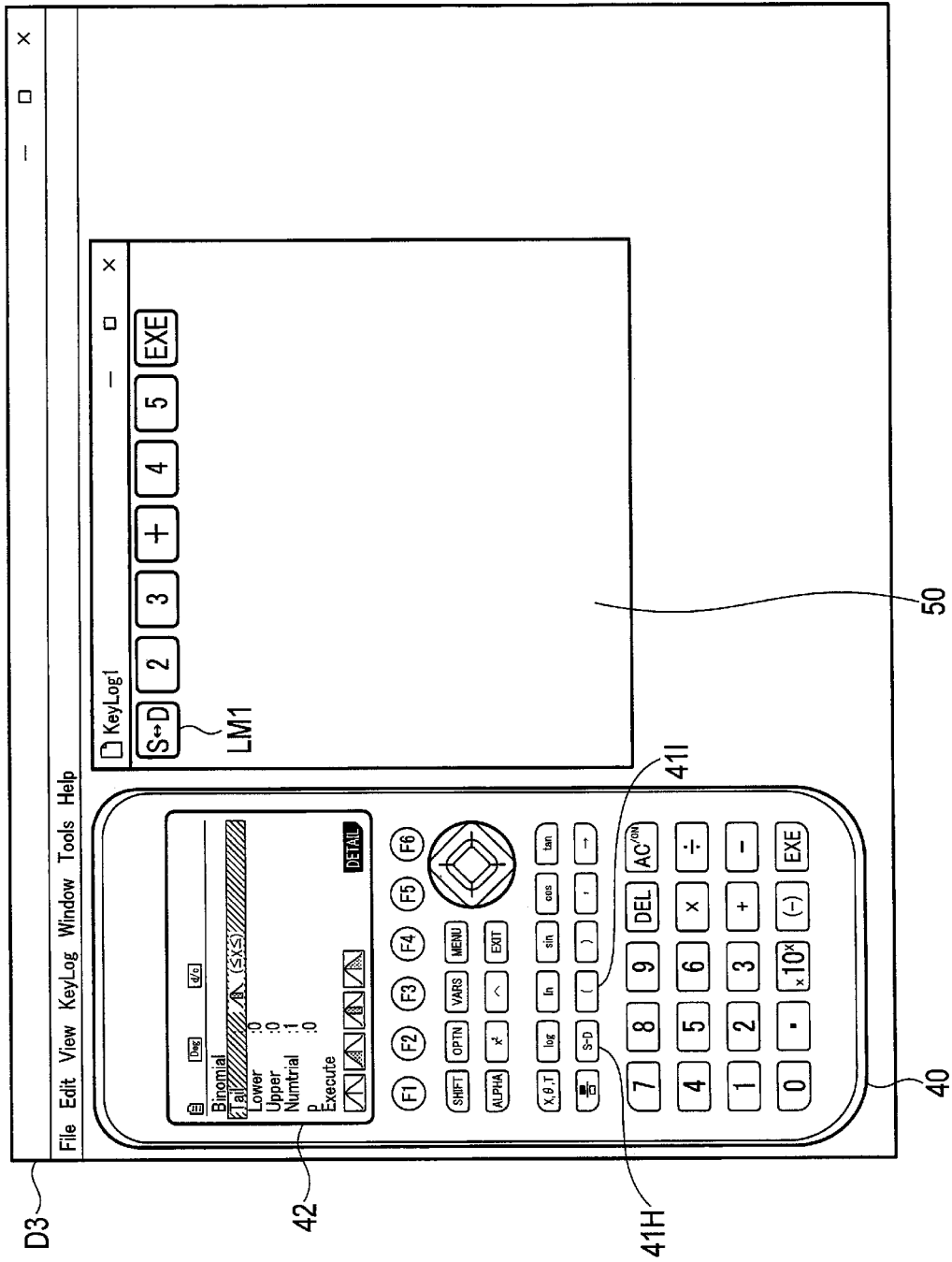
FIG. 13 is a picture illustrating an example of a calculator emulator screen based on key log data after a function is added.

FIG. 13 is a picture illustrating an example of a calculator emulator screen D3 at the time of playing back a key log based on the key log data 22b after the function is added, illustrated in FIG. 9A. As illustrated in FIG. 13, in the file area 50, content of the key log data 22b (L1) illustrated in FIG. 9A is displayed. That is, a symbol LM1 for "S-D" (indicating the key 41H) corresponding to a key code at the beginning of the key log, namely, the key operation for indicating the function (Run), is displayed.

On the other hand, although the function (Run) is executed in a case where the key log is recorded, at the time of playing back the key log, the function "Distribution" in the current menu 42B after the addition of the function is executed, and a screen showing details of a computation by the function "Distribution" is displayed on the display 42.

The key log data 22b illustrated in FIG. 9A includes the key code of a key operation for indicating the icon of the function (Run) and the following key codes of "2", "3", "+", "4", "5", and "EXE". However, the key log is not a key log recorded in a case where a computation of the function "Distribution" is executed. Therefore, a proper computation based on the key codes cannot be played back.

Next, a key log playback based on the key log data 22b illustrated in FIG. 9B of a case where the key logging module 22a2 looks up the key correspondence data table 22c and converts a key code into a piece of virtual key information will be described.

The key logging module 22a2 reads an item of key code data from the key log data 22b (step B1). In a case where the item of key code data is a piece of virtual key information (step B2, Yes), the key logging module 22a2 looks up the key correspondence data table 22c with the piece of virtual key information and obtains a key code corresponding to the piece of virtual key information.

For example, in a case of a piece of virtual key information L21 [0x0f0x12] read from key log data 22b (L2) in FIG. 9B, the key code [0x0f0x18] corresponding to [0x0f0x12] can be obtained by looking up the key correspondence data table 22c illustrated in FIG. 5B.

The key logging module 22a2 transmits the key code [0x0f0x18] corresponding to the piece of virtual key information to the calculator module 22a1 (step B4).

This enables the calculator module 22a1 to execute, based on the key code [0x0f0x18] indicating "I", the function 423 (Run) assigned to the position of "I" in the menu 42B (FIG. 10) after the addition of the function.

In contrast, if the item of key code data read from the key log data 22b is not a piece of virtual key information (step B2, No), that is, if the items of key code data is a key code, the key logging module 22a2 transmits the item of key code data to the calculator module 22a1 as it is.

If reading of all items of key code data in the key log data 22b is not finished (step B5, No), the key logging module 22a2 repeats the processing described above (steps B1 to B4). If the reading of all items of key code data is finished (step B5, Yes), the CPU 21 finishes the key log playback processing.

Figure 14:
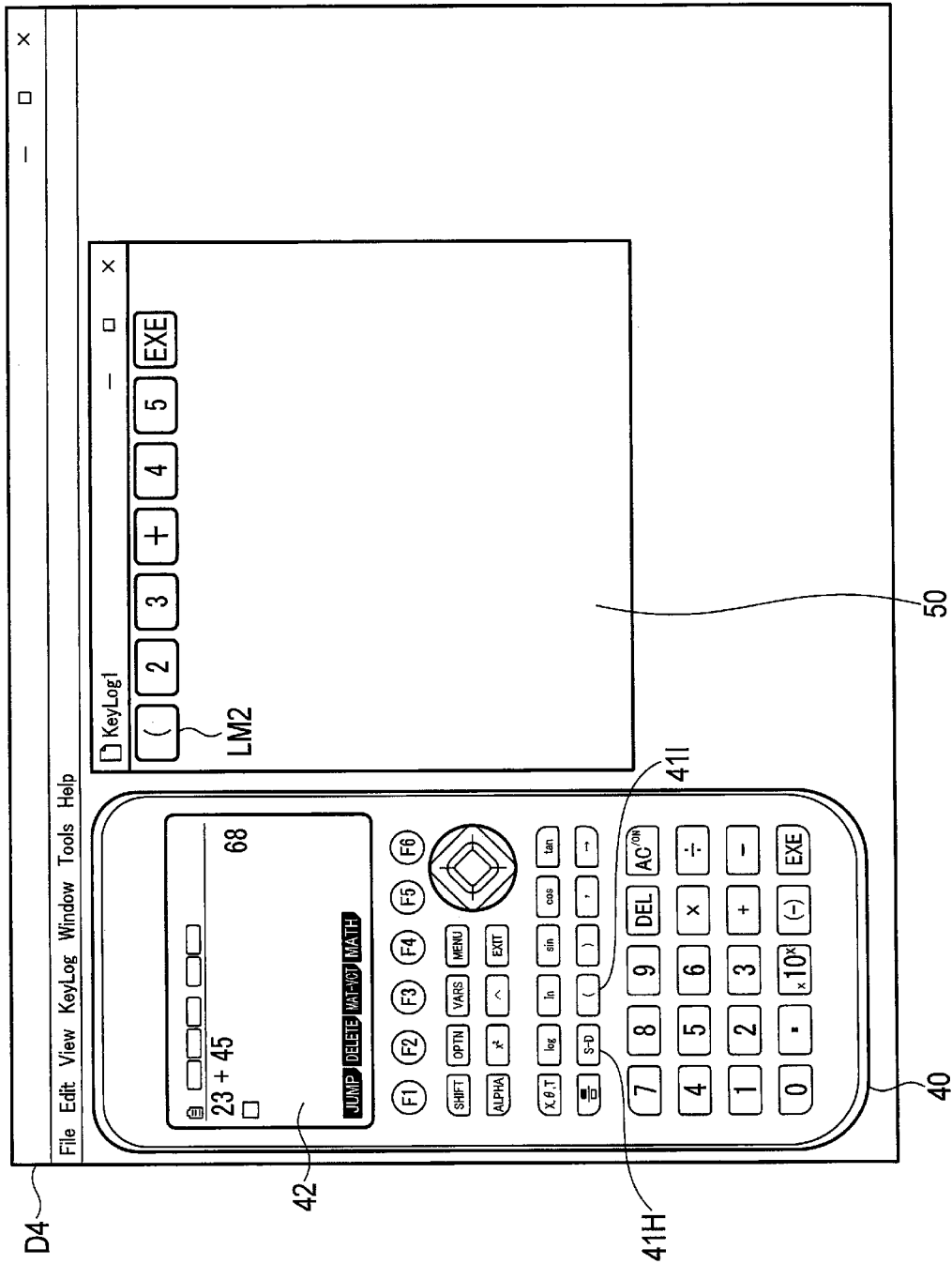
FIG. 14 is a picture illustrating an example of a calculator emulator screen based on key log data before a function is added.

FIG. 14 is a picture illustrating an example of a calculator emulator screen D4 at the time of playing back a key log based on the key log data 22b (L2) before a function is added, illustrated in FIG. 9B. As illustrated in FIG. 14, in the file area 50, content of the key log data 22b (L2) illustrated in FIG. 9B. That is, for the piece of virtual key information L21 [0x0f0x12] at the beginning corresponding to the function "RUN", since the key code [0x030x18] corresponding to the key 41I for "I" is obtained with reference to the key correspondence data table 22c, the function "RUN" is executed, and a symbol LM2 corresponding to the key 41I for "I" is displayed in the file area 50.

Subsequently, a computation is played back based on key codes of key operations on "2", "3", "+", "4", "5", and "EXE", a screen showing details of the same computation as that performed where the key log is recorded is displayed on the display 42, and symbols corresponding to the key codes are displayed in the file area 50.

Here, assume that a key operation for indicating the icon of the function 423 (Run) displayed at the position of "I" is performed in the menu 42B after the addition of a function to execute an addition of "23+45" as described above. In this case, the key log data 22b as illustrated in FIG. 9D is recorded.

That is, the key log data 22b illustrated in FIG. 9D of the function (Run) executed from the menu 42B after the addition of a function is the same as the key log data 22b illustrated in FIG. 9B of the function (Run) executed from the menu 42A before the addition of a function.

In this manner, even in a case where positions of functions are moved by a change of the arrangement of functions or the number of functions made in the menu 42A by an update or the like, the electronic apparatus 20 in the first embodiment handles the key log data 22b that has been recorded in the storage 22 in the same manner before and after the change in the menu, so that proper key log data can be output.

Second Embodiment

Next, actions in a second embodiment will be described.

In the first embodiment, the key logging module 22a2 looks up the key correspondence data table 22c and obtains a piece of virtual key information corresponding to a key code if a key operation satisfies the predetermined condition. In the second embodiment, a calculator module 22a1 obtains a piece of virtual key information corresponding to a key code.

In this case, as with the key logging module 22a2 described in the first embodiment, the calculator module 22a1 executes the processing of steps A2 to A4 in FIG. 6 based on a key code received from an input device 26 and transmits a piece of virtual key information to a key logging module 22a2 in place of the key code. The key logging module 22a2 adds the piece of virtual key information received from the calculator module 22a1 to key log data 22b.

In a case where key log playback processing is performed, the key logging module 22a2 transmits an item of key code data (a key code, a piece of virtual key information) read from the key log data 22b to the calculator module 22a1. In a case where the item of key code data received from the key logging module 22a2 is a piece of virtual key information, the calculator module 22a1 executes the processing of step B3 illustrated in FIG. 7 and obtains a key code corresponding to the piece of virtual key information.

This enables the calculator module 22a1 to play back a computation based on key codes corresponding to pieces of virtual key information.

Note that, although a piece of virtual key information is supposed to be code data in the same format as that of a key code input by a key operation in the above description, an item of text data representing the name of a function (application) can be used as a piece of virtual key information.

For example, in a case where a key operation for indicating the execution of the function "RUN" is performed, the calculator module 22a1 transmits an item of text data "RUN" corresponding to the function "RUN" to the key logging module 22a2. The key logging module 22a2 records the item of text data "RUN" corresponding to the function "RUN" as a record of the key log data 22b.

In a case where the key log playback processing is performed, the key logging module 22a2 transmits an item of text data in the key log data 22b to the calculator module 22a1 as it is. The calculator module 22a1 obtains a key code corresponding to the function "RUN" corresponding to the item of text data and plays back a computation based on key codes as described above.

In a case where an item of text data representing the name of a function is used as a piece of virtual key information corresponding to the function, a symbol corresponding to the function displayed in a file area 50 can be provided as a symbol corresponding to the item of text data representing to the name of the function rather than a symbol of a key subjected to a key operation for inputting a key code.

Figure 15:
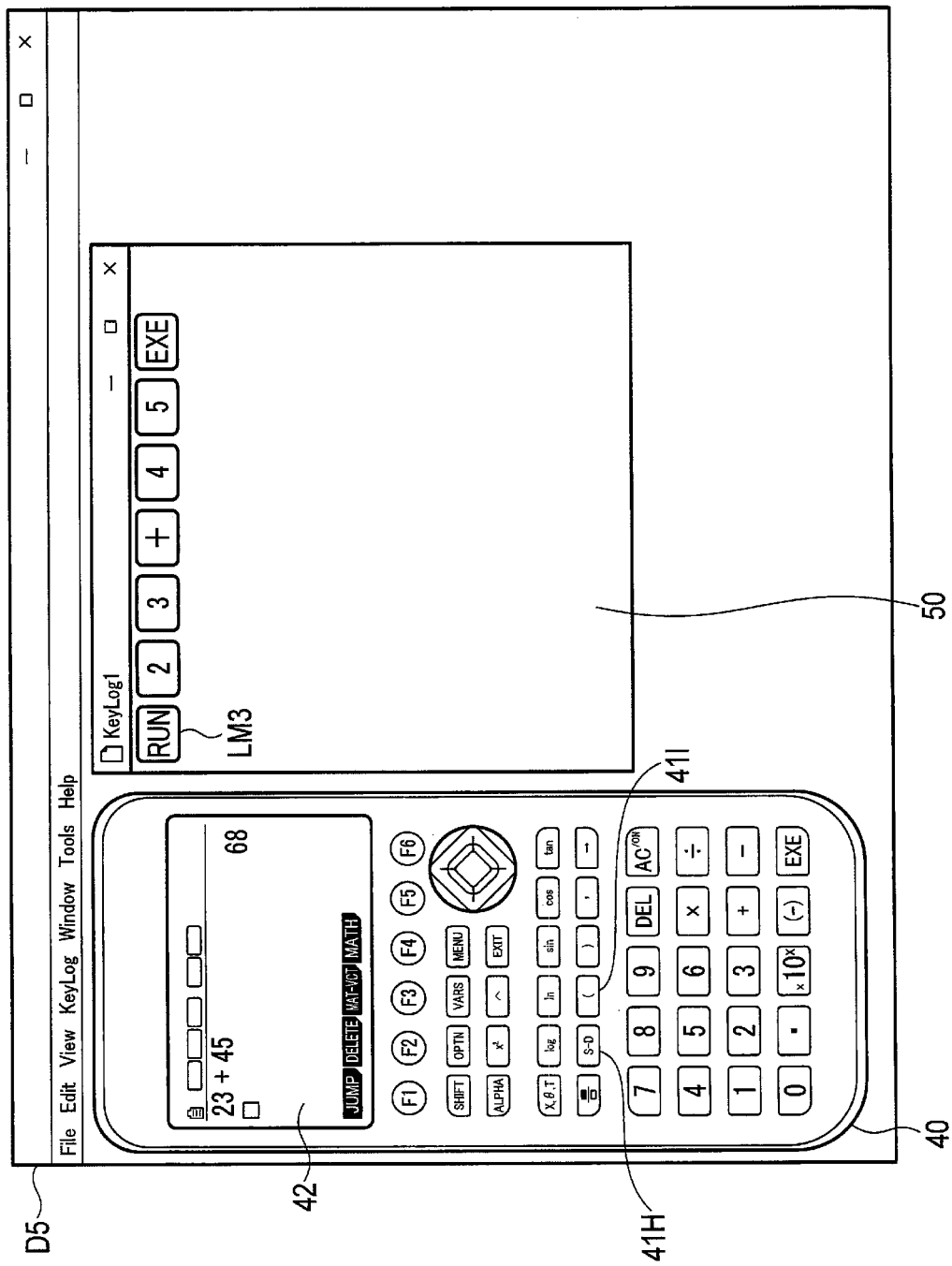
FIG. 15 is a picture illustrating an example of a calculator emulator screen at the time of playing back a key log in a case where an item of text data representing the name of a function is used as a piece of virtual key information.

FIG. 15 is a picture illustrating an example of a calculator emulator screen D5 at the time of playing back a key log in a case where an item of text data representing the name of a function is used as a piece of virtual key information. As illustrated in FIG. 15, in the file area 50, a symbol LM3 that clearly shows a function name based on the item of text data "RUN" corresponding to the function "RUN" is displayed. By displaying the name of a function in the file area 50 as a record of a key log in this manner, it is easy to recognize an executed function by referring to the symbol LM3.

Such a configuration enables an electronic apparatus 20 in the second embodiment to provide the same effect as in the first embodiment.

Techniques described in the embodiments can be distributed in the form of a program that can be executed by a computer with the program stored in a recording medium such as a memory card (ROM card, RAM card, etc.), a magnetic disk (flexible disk, hard disk, etc.), an optical disc (CD-ROM, DVD, etc.), and a semiconductor memory. The computer reads the program recorded in the recording medium, and by actions of the computer being controlled by this program, the same processing as the functions described in the embodiments can be implemented.

In addition, data used by the program for implementing the techniques can be transmitted over a network (the Internet etc.) in the form of a computer code, and program data can be fetched from a computer (server apparatus etc.) connected to the network to implement the same functions as in the embodiments described above.

Note that the present disclosure is not limited to the foregoing embodiments. For practical implementation, various modifications may be adopted without departing from the gist of the disclosure. Also, the embodiments may be discretionarily combined for implementation, and such combinations will produce combined effects. Still more, the foregoing embodiments involve various inventive aspects, and appropriate combinations of the features disclosed herein shall permit various inventions to be derived. For example, one or more of the features discussed for a certain embodiment may be omitted, and provided that such modification can solve the intended problem and bring the intended effects, the modification should be deemed an invention.

What is claimed is:

1. An electronic apparatus comprises:
   at least one processor configured to:
   identify identification information of a key subjected to a key operation with an input device;
   determine whether the identification information of the key subjected to the key operation indicates a key operation for designating a function set in a menu displayed on a screen;
   in response to determining that the identification information of the key subjected to the key operation does not indicate the key operation for designating the function set in the menu displayed on the screen:
      control a storage to store the identification information; and
   in response to determining that the identification information of the key subjected to the key operation indicates the key operation for designating the function set in the menu displayed on the screen:
      look up a data table stored in the storage for virtual key information indicating the function set in the menu displayed on the screen, the virtual key information corresponding to the identification information; and
      control the storage to store the virtual key information indicating the function set in the menu displayed on the screen rather than storing the identification information.

2. The electronic apparatus according to claim 1, wherein the function is one of a plurality of functions set in the menu displayed on the screen.

3. The electronic apparatus according to claim 1, wherein the virtual key information is a name of the function set in the menu displayed on the screen.

4. The electronic apparatus according to claim 1, wherein the virtual key information is a name of the function set in the menu displayed on the screen.

5. The electronic apparatus according to claim 1,
   wherein the function set in the menu and indicated by the virtual key information is a function of a calculator emulator program, and
   wherein the at least one processor is configured to control the storage to store the virtual key information as a record of a key log.

6. The electronic apparatus according to claim 5, wherein the at least one processor is configured to:
   read one of a plurality of records of the key log;
   determine whether the one of the plurality of records read from the key log is the record of the virtual key information; and
   in response to determining that the one of the plurality of records read from the key log is the record of the virtual key information,
      look up the data table stored in the storage for the identification information designating the function set in the menu displayed on the screen; and
      execute the function based on the identification information.

7. A control method for an electronic apparatus, the control method comprising:
   identifying identification information of a key subjected to a key operation with an input device;
   determining whether the identification information of the key subjected to the key operation indicates a key operation for designating a function set in a menu displayed on a screen;
   in response to determining that the identification information of the key subjected to the key operation does not indicate the key operation for designating the function set in the menu displayed on the screen:
      control a storage to store the identification information; and
   in response to determining that the identification information of the key subjected to the key operation indicates the key operation for designating the function set in the menu displayed on the screen:
      looking up a data table stored in the storage for virtual key information indicating the function set in the menu displayed on the screen, the virtual key information corresponding to the identification information; and
      controlling the storage to store the virtual key information indicating the function set in the menu displayed on the screen rather than storing the identification information.

8. A non-transitory recording medium having a program recorded thereon that is executable to control a computer of an electronic apparatus to at least perform:
   identifying identification information of a key subjected to a key operation with an input device;
   determining whether the identification information of the key subjected to the key operation indicates a key operation for designating a function set in a menu displayed on a screen;
   in response to determining that the identification information of the key subjected to the key operation does not indicate the key operation for designating the function set in the menu displayed on the screen:
      control a storage to store the identification information; and
   in response to determining that the identification information of the key subjected to the key operation indicates the key operation for designating the function set in the menu displayed on the screen:
      looking up a data table stored in the storage for virtual key information indicating the function set in the menu displayed on the screen, the virtual key information corresponding to the identification information; and
      controlling the storage to store the virtual key information indicating the function set in the menu displayed on the screen rather than storing the identification information.

* * * * *